United States Patent [19]

Self

[11] 4,011,195

[45] Mar. 8, 1977

[54] POLYMERIZABLE COMPOSITIONS CONTAINING UNSATURATED POLYESTER RESINS AND AQUEOUS ALKALI METAL SILICATE, METHOD OF PREPARING SHAPED ARTICLES FROM SUCH COMPOSITIONS AND THERMOSET PRODUCTS THEREOF

[75] Inventor: James M. Self, Taylor, S.C.

[73] Assignee: H. H. Robertson Company, Pittsburgh, Pa.

[22] Filed: Jan. 29, 1975

[21] Appl. No.: 544,966

Related U.S. Application Data

[63] Continuation-in-part of Ser. No. 460,489, April 12, 1974, abandoned.

[52] U.S. Cl. .................... 260/40 R; 106/83; 106/DIG. 2; 260/29.2 UA
[51] Int. Cl.² .................................. C08K 3/34
[58] Field of Search .... 260/40 R, 29.2 UA, 29.2 E; 106/83, DIG. 2

[56] References Cited

UNITED STATES PATENTS

| | | | |
|---|---|---|---|
| 2,634,208 | 4/1953 | Miscall | 106/DIG. 2 X |
| 3,297,616 | 1/1967 | Fisher et al. | 260/45.7 R X |
| 3,371,712 | 3/1968 | Adams | 260/29.2 UA X |
| 3,392,127 | 7/1968 | du Tertre | 260/40 R X |
| 3,560,253 | 2/1971 | Ashton | 260/40 R X |
| 3,926,905 | 12/1975 | Nose et al. | 106/83 |

Primary Examiner—Donald E. Czaja
Assistant Examiner—S. M. Person
Attorney, Agent, or Firm—Harry B. Keck; George E. Manias

[57] ABSTRACT

Polymerizable unsaturated polyester resin syrups can be extended with aqueous alkali metal silicate in compositions containing from 0.1 to 10.0 parts by weight of aqueous alkali metal silicate for each part by weight of the unsaturated polyester resin syrup. The preferred alkali metal silicate is aqueous sodium silicate. Compositions further can be extended (a) by the addition of reactive fillers such as metal oxides or hydrated metallic salts; (b) by the addition of inert fillers such as clay, silica, glass fibers, perlite; or (c) by the addition of both (a) and (b). The fillers also may include fibrous reinforcing materials such as dispersed glass fibers, randomly oriented fiber mats, wound filaments and woven fabrics. The fillers may be present in amounts from about 0.1 to about 5 times the combined weight of aqueous alkali metal silicate and unsaturated polyester resin syrup.

The compositions can be employed in coatings, laminates, cast articles, molded articles, or other shaped articles. The polymerized products are resistant to combustion, have a low fuel content, a low flame spread and are useful thermal insulating materials. The products furthermore have a low smoke content. When exposed to fire, the organic content of these materials is burned and the residual inorganic content is converted to a refractory ceramic material which resists further thermal deterioration and functions as a thermal insulator to resist thermal transfer.

28 Claims, 5 Drawing Figures

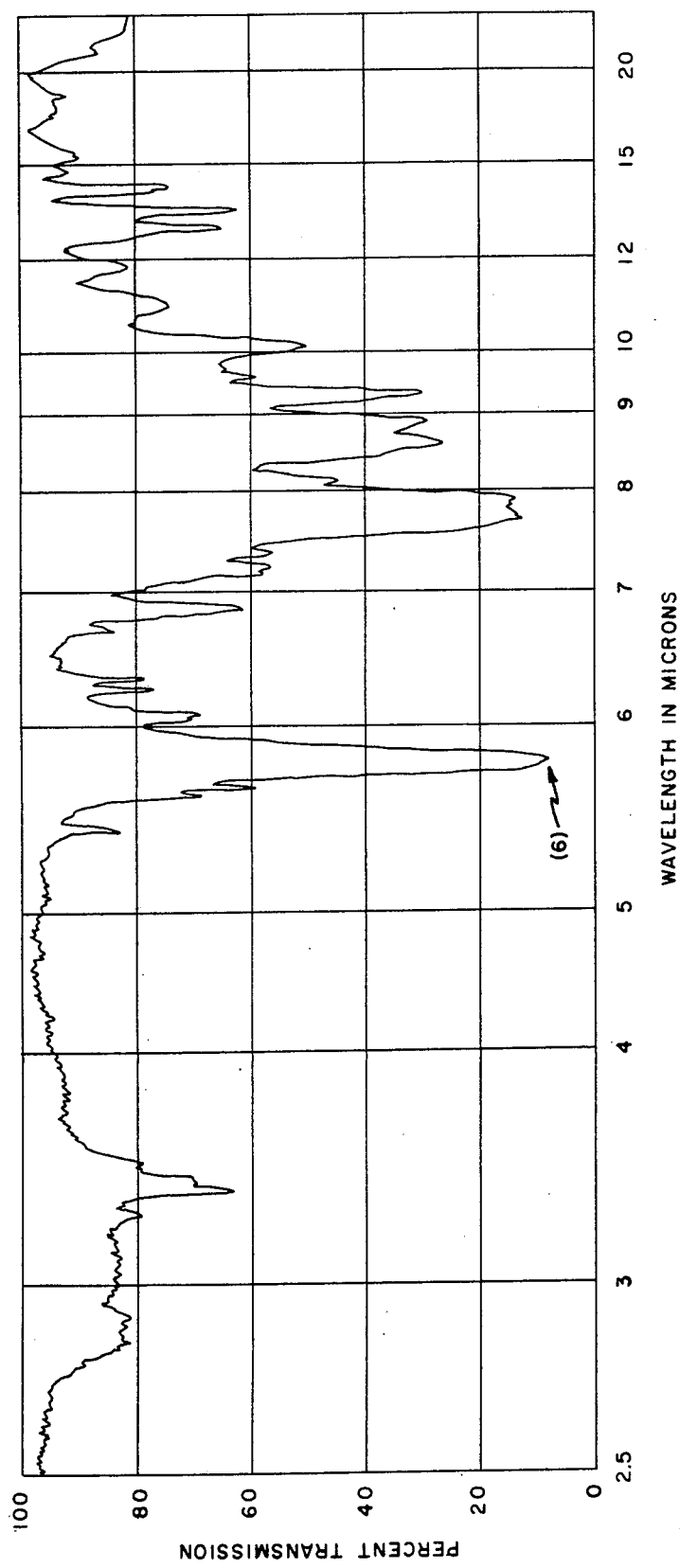

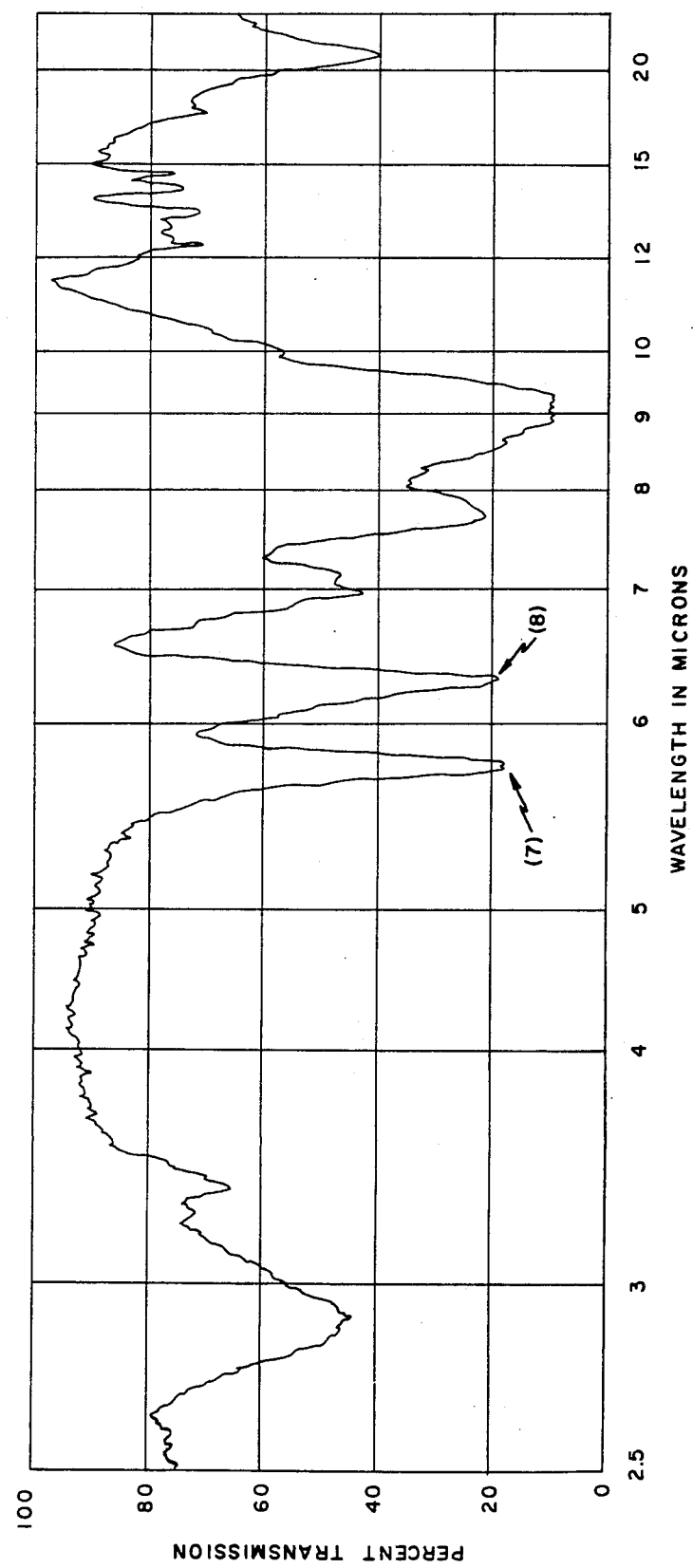

POLYMERIZABLE COMPOSITIONS CONTAINING UNSATURATED POLYESTER RESINS AND AQUEOUS ALKALI METAL SILICATE, METHOD OF PREPARING SHAPED ARTICLES FROM SUCH COMPOSITIONS AND THERMOSET PRODUCTS THEREOF

CROSS-REFERENCES TO RELATED APPLICATIONS

This application is a continuation-in-part of copending application Ser. No. 460,489 filed Apr. 12, 1974 and now abandoned.

BACKGROUND OF THE INVENTION

1. Field of the Invention

This invention relates to polymerizable unsaturated polyester resin syrup compositions, to methods of curing such polymerizable unsaturated polyester resin syrup compositions in an alkaline admixture with significant quantities of aqueous alkali metal silicate, preferably sodium silicate, and to the thermoset products obtained thereby.

2. Description of the Prior Art

Unsaturated polyester resin syrups are employed in the production of coatings, molded, cast and hand-lay-up products such as flat and profiled building sheets, automobile fenders and other shaped components, furniture, plumbing fixtures, duct work, boats, electrical component housings, electrical circuit boards, and the like. The unsaturated polyester resin syrups are frequently reinforced with fibrous fillers, customarily glass fibers and may be extended with inert particulate fillers such as wood flour, silica, glass beads, clay, calcium carbonate and the like. See Polyesters and Their Applications, Bjorksten et al, Reinhold Publishing Corporation, New York 1960 (4th printing).

Unsaturated polyester resin syrups also have been extended by dispersing water in the resin in the form of small droplets to create a water-in-resin emulsion. Such emulsions have been described as containing 40 to 85 percent by weight water in combination with 15 to 60 percent by weight of unsaturated polyester syrups. See U.S. Pat. No. 3,591,191. Compositions containing 50 to 80 percent by weight of water in a mixture of water and unsaturated polyester resin syrup are described in U.S. Pat. No. 3,687,883. The addition of small quantities of sodium silicate to the water phase of the water-in-resin emulsions has been described. See German Offenlegungsschrift No. 1,962,393.

Unsaturated polyester resin syrups have been combined with solid sodium silicate and with liquid sodium silicate and thereafter reacted with dolomite, U.S. Pat. No. 3,392,127 and its counterparts British Pat. Nos. 925,625 and 960,961 and France patents Nos. 1,195,743 and addition patent No. 81,527. This source of technology asserts that liquid sodium silicate cannot be mixed with more than 0.3 times its weight of unsaturated polyester resin syrup prior to addition of dolomite.

Unsaturated polyester resin syrup has been combined with aqueous sodium silicate in a non-alkaline mixture to produce microporous articles. See U.S. Pat. No. 2,505,353.

Small quantities of silica aerogel have been employed as thickeners for unsaturated polyester resins, U.S. Pat. No. 2,610,959.

SUMMARY OF THE INVENTION

The present compositions combine as an alkaline mixture (a) an unsaturated polyester resin syrup and (b) aqueous alkali metal silicate, preferably sodium silicate. The present compositions do not appear to be emulsions, but instead appear to blend into useful mixtures wherein the identity of the aqueous alkali metal silicate is significantly altered. The identity of the unsaturated polyester resin ingredient of the unsaturated polyester resin syrup also is altered. In this sense the present compositions and products are unlike the water extended polyester resins of the prior art.

In the absence of a catalyst, the unsaturated polyester resin and aqueous sodium silicate are individually water white to amber clear liquids. On mixing, the mixture develops a cloudy white appearance and resembles immediately a partially gelled sodium silicate. The viscosity of the mixture increases rapidly until the mixture resembles a doughy paste having the consistency of potter's clay.

The aqueous alkali metal silicate is provided in quantities ranging from 0.1 to 10 parts by weight, preferably 0.3 to 5 parts by weight, for each part of weight of unsaturated polyester resin syrup. In the present specification, the expression unsaturated polyester resin syrup is employed to identify what is well known in the art as the combination of an unsaturated polyester resin and a copolymerizable monomer. The preferred aqueous alkali metal silicate contains from about 45 to about 85 parts by weight of water and about 55 to 15 parts by weight of alkali metal silicate solids having a weight ratio of $SiO_2/Na_2O$ from 1.5 to 3.75. Suitable initiating catalysts for the polymerization of unsaturated polyester resin syrups are included in the composition. These are normally peroxy compounds. Suitable accelerators for the initiators may be included. The initiator may be added to the unsaturated polyester resin syrup or to the aqueous alkali metal silicate. The accelerator, if employed, preferably is added to that liquid component which does not contain the initiator.

Where fillers are employed they may be added to either of the liquid components or to both of the liquid components. In general the amount of filler may be from 0.01 to 5.0 parts by weight for each part by weight of the mixture of resin syrup and aqueous sodium silicate. Preferably where the fillers are inert bulking agents such as finely divided perlite or expanded vermiculite, they are not employed until after the two liquids have been mixed. The inert bulking agents are employed in amounts from 0.1 to 10 weight percent of the composition.

A preferred active filler is aluminum oxide trihydrate $Al_2O_3 \cdot 3H_2O$, also known as hydrated alumina. This material may be incorporated into either or both of the liquid components in quantities up to about 1.5 times the weight of the unsaturated polyester resin syrup and up to about 3 times the weight of the aqueous alkali metal silicate. Thus the amount of aluminum oxide trihydrate should be less than the sum of 1.5 times the weight of resin syrup plus 3.0 times the weight of aqueous alkali metal silicate. Preferably the aluminum oxide trihydrate is pulverized to a fineness approximating minus-325 mesh U.S. standard screen.

The inclusion of aluminum oxide trihydrate in the present compositions increases the physical strength of the cured compositions, e.g. hardness and abrasion resistance.

Where reinforcing fibrous fillers are employed, glass fibers are preferred, specifically the glass fibers which are useful in reinforcing plastic sheets, i.e., randomly oriented fibers of the type employed in glass fiber reinforced plastic laminates. The glass fibers may be employed as a deposited mat of fibers, as a preformed glass fiber mat or may be in the form of continuous filaments or woven fabrics. In general the weight of glass fibers is from about 10 to 200 percent of unsaturated polyester resin syrup in the final polymerizable composition.

The present materials have excellent processing characteristics. Within minutes after forming, the resulting shapes have sufficient strength to be handled and put to use. The materials more importantly have a low smoke generating potential when burned.

Unsaturated polyester resins are customarily fabricated from polyesterification of polycarboxylic acids or polycarboxylic acid anhydrides and polyols, customarily glycols. One of the ingredients in the polyester contains ethylenic unsaturation, customarily the polycarboxylic acid. Typically unsaturated polyester resins are fabricated from dicarboxylic acids such as phthalic acid, phthalic anhydride, adipic acid, succinic acid, tetrahydrophthalic acid or anhydride, tetrabromo phthalic acid or anhydride, maleic acid or anhydride, fumaric acid. Typical glycols include ethylene glycol, propylene glycol, butylene glycol, neopentyl glycol, diethylene glycol, dipropylene glycol, polyethylene glycol, polypropylene glycol. Occasionally trihydric and higher polyols are included in the polyester such as trimethylol ethane, trimethylol propane, penta erythritol. Customarily a slight stoichiometric excess of glycol is employed in preparing the unsaturated polyester.

Unsaturated polyester resin syrups are prepared when the unsaturated polyester resin is combined with copolymerizable monomers which contain terminal vinyl groups. Such monomers include styrene, alpha-methyl styrene, o-chlorostyrene, vinyl toluene, acrylic acid, methacrylic acid, alkyl acrylates, alkyl methacrylates, divinyl benzene, diacrylates, dimethacrylates, triacrylates, trimethacrylates and the like. Customarily the copolymerizable monomer is provided in an amount to constitute from about 10 to 40 weight percent of the unsaturated polyester resin syrup, i.e., the unsaturated polyester resin comprises about 90 to 60 weight percent of the resin syrup.

A desirable modifying copolymerizable monomer is a reaction product of polyepoxide with acrylic or methacrylic acid. Such products are described in U.S. Pat. Nos. 3,373,075, 3,301,743. Similar products can be prepared by combining a polyol such as bisphenol-A with glycidyl acrylate or glycidyl methacrylate. Such modifying copolymerizable monomers can be employed as a partial replacement for other copolymerizable monomers or as a partial replacement for a portion of the unsaturated polyester resin of the resin syrup.

Aqueous sodium silicate is commercially available as a liquid containing 45 to 85 percent by weight water and the balance sodium silicate. The weight ratio of $SiO_2/Na_2O$ is from about 1.5 to about 3.75 in the commercially available materials.

Aqueous potassium silicate is commercially available as liquids containing 54 to 71 percent by weight water and the balance potassium silicate. The potassium silicate has a weight ratio of $SiO_2/K_2O$ from about 1.80 to 2.50. Aqueous lithium silicate is commercially available with weight ratios of $SiO_2/Li_2O$ of 2.50.

Typical initiators for unsaturated polyester resin syrups include peroxy materials such as benzoyl peroxide, cumene hydroperoxide, tertiary butyl peroxide and the like. A particularly useful peroxy initiator for room temperature curing is 2,5-dimethyl hexane-2,5-dimethyl-diper-2-ethyl hexoate. The peroxy initiators customarily are provided in the form of pastes in which the peroxy material is dispersed in a glycol. Accelerators for the peroxy initiators include cobalt naphthenate and cobalt octoate, for example.

The mixing of the liquid unsaturated polyester resin syrup and the aqueous alkali metal silicate may occur in several ways. The materials may be dumped into a common container and stirred. The two liquid materials may be sprayed separately with the sprays of the two materials impinging upon one another to provide a combined spray in which the spray particles are homogeneously admixed. The two liquids may be introduced into spraying equipment which has a common mixing chamber preceding the spray nozzle. In most instances the two liquids, when combined, become thixotropic and tend to increase viscosity quite rapidly. In some instances the materials can be mixed and maintained reasonably fluid for extended periods of time. The initiator and accelerator, if any, are selected so that the initiation of polymerization of the unsaturated polyester resin syrup can be controlled by the operator. Customarily an initiator is selected which will require heating of the composition to initiate polymerization, i.e., a so-called high temperature initiator. The polymerization of the unsaturated polyester resin component may commence with the step of mixing together with the aqueous alkali metal silicate. Typical spray-up applications may employ this polymerization procedure. At the other extreme condition, the mixture may be formed into a desired shape for subsequent polymerization of the unsaturated polyester resin syrup. Sheet molding compositions and molding powders may be formed to utilize the delayed polymerization characteristic.

In a preferred embodiment of the invention, the unsaturated polyester resin syrup contains powdered hydrated alumina and the aqueous alkali metal silicate also contains hydrated alumina. The amount of unsaturated polyester resin syrup is minimized so that the final product possesses a low fuel content. When exposed to fire, the cured products resist temperature increases initially because of the thermal dehydration of the hydrated alumina and thereafter by vitrification of the hybrid silica, hereinafter described. Compositions which include hydrated alumina have a lowered smoke generating characteristic.

According to the methods of this invention, cured thermoset articles can be prepared from a mixture of unsaturated polyester resin syrup and aqueous alkali metal silicate by combining the two ingredients along with a polymerization initiator for the unsaturated polyester resin syrup. The composition is shaped into a mass having the shape of the desired article and retained in that shape until the composition is cured. The shaping may occur by molding, pressing, casting, hand-lay-up, spraying onto a substrate trowelling, extrusion, rolling and the like. Suitable substrates include metal sheets (building panels, floor decking); plastic sheets (acrylic sheets, glass fiber reinforced polyester sheets); organic foams (polyurethane foam, polystyrene foam).

The polymerization initiator can be included in either of the two components. Where a high temperature initiator is employed, it is preferred that the initiator be included in the unsaturated polyester resin. Where a room temperature initiator is employed, it is preferably included in the aqueous alkali metal silicate solution. In that circumstance, a polymerization accelerator will be included in the unsaturated polyester resin syrup. The two components can be mixed in a mixing tank or pipe. The two components can be separately formed into sprays which are caused to impinge upon one another and thereby accomplish the desired mixing. The two components can be combined in a mixing chamber and sprayed as a mixture. Either or both of the two components can include inert fillers. Preferably with bulking agents such as finely divided perlite or expanded vermiculite, the inert fillers are added to the components after they have been mixed.

A particularly preferred product resulting from the practice of the present invention is a fiber reinforced laminate article which includes randomly oriented reinforcing fibers which are dispersed in a continuous phase of the thermoset resinous composition. The resinous composition in its cured form includes unsaturated polyester resin crosslinked with the copolymerizable monomer of the polyester resin syrup. However the unsaturated polyester resin is substantially free of uncombined carboxylic acid radicals and instead includes alkali metal carboxylate salts. In this respect the cured resin component differs from the cured unsaturated polyester resin products of the prior art. Moreover the $SiO_2$ content of the resulting product exists primarily in the form of a hybrid colloidal silica gel homogeneously dispersed throughout the cross-linked unsaturated polyester resin syrup which contains carboxylate salt end groups.

The laminates preferably include glass fibers as the reinforcing fibers in amounts from about 6 to 30 percent of the weight of the laminate. The laminates may be further reinforced by including as a core a sheet of expanded metal lath.

Typical products of the present compositions are cast articles such as furniture, frame moldings, lamp bases, statuary, sheet targets, toys; molded articles such as automobile surface elements, electrical housings; hand-lay-up or spray-up articles such as boat hulls, bathroom sinks, tubs and shower stalls, cargo containers; reinforced laminates such as building construction panels, ventilator components, hoods, ducting, ceiling tiles, window frames, doors; cast-in-place or spray-in-place articles such as fire resistant coatings.

DESCRIPTION OF THE PREFERRED EMBODIMENT(S)

Figure 2:
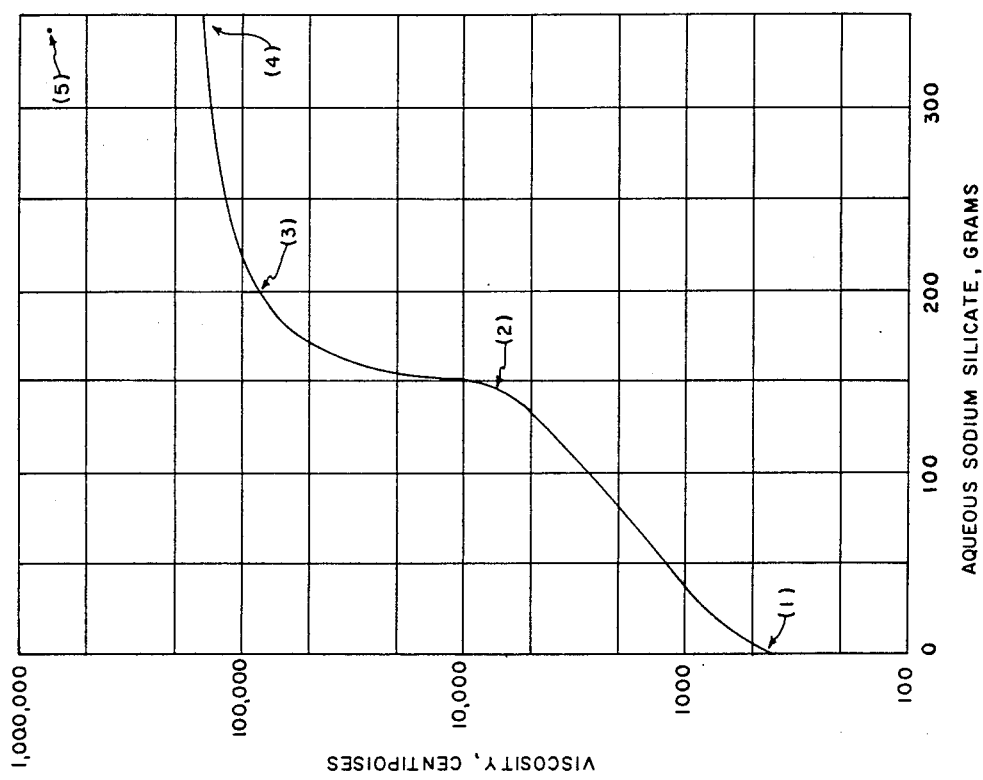
FIG. 2 is a graphical presentation of viscosity data.

According to this invention useful products are prepared by mixing 1. a pourable and/or sprayable polymerizable unsaturated polyester resin syrup which may be a liquid or a paste in which the syrup is unfilled or is filled with active fillers such as hydrated alumina or other hydrated metallic salts or oxides and/or is filled with inert fillers such as silica, calcium carbonate; and 2. a pourable and/or sprayable liquid consisting of aqueous alkali metal silicate solution which may be unfilled or may be filled with active fillers such as hydrated alumina or other hydrated metallic salts or oxides and/or may be filled with inert fillers such as silica, calcium carbonate.

A polymerization initiator for the unsaturated polyester resin syrup is included in the mix.

Unsaturated polyester resin syrup customarily is acidic and has an acid number which is the milligrams of potassium hydroxide required to neutralize 1 gram of the resin. The acid number usually is reported on the basis of "100 percent solids". This refers to the unsaturated polyester resin alone without the dilution of the copolymerizable monomer. For the present compositions, the unsaturated polyesters are preferred with an acid number from 10 to 100 on a 100 percent solids basis.

The aqueous sodium silicate is highly alkaline. The pH of the resulting composition of this invention is alkaline, i.e., the pH is above 7.0.

The mix may be further extended, after mixing, by combining into the mixture inert fillers such as refractory aggregates, ground glass, glass microspheres, silica, magnesium oxide, mullite, flyash, zirconia, clays, bentonite, kaolin, attipulgite, titanium dioxide, antimony oxide, pigments, low density insulating materials, such as perlite or expanded vermiculate, fibrous reinforcing material such as glass fibes, asbestos fibers, mineral wool. Inert fillers tend to increase the density or to decrease the density of the final product according to the selected filler, and may tend to reinforce the resulting product, particularly where fibrous fillers are selected. Incombustible fillers also disperse the combustible components and consequently lower the fuel content of the final product. Fillers can comprise from 0.01 to 5.0 parts by weight for each part by weight of the mix.

The materials of this invention are preferably cured at temperatures below about 100° C to minimize the vaporizing tendency of the water content of the aqueous alkali metal silicate. Excessive curing temperatures may cause rupturing or spalling of the resulting shaped article. When the two liquids are mixed, along with suitable fillers, the consistency of the product is similar to potter's clay in a preferred embodiment. In this consistency the mixture can be troweled and can be applied to horizontal, vertical and overhead surfaces by troweling, rolling, pressing or extrusion as desired to produce coatings. The mixture also can be injection molded, press molded or employed in hand-lay-up operations or in casting operations.

Preferably the viscosity of the unsaturated polyester resin syrup ranges from about 50 to 5,000 centipoises.

Figure 1:
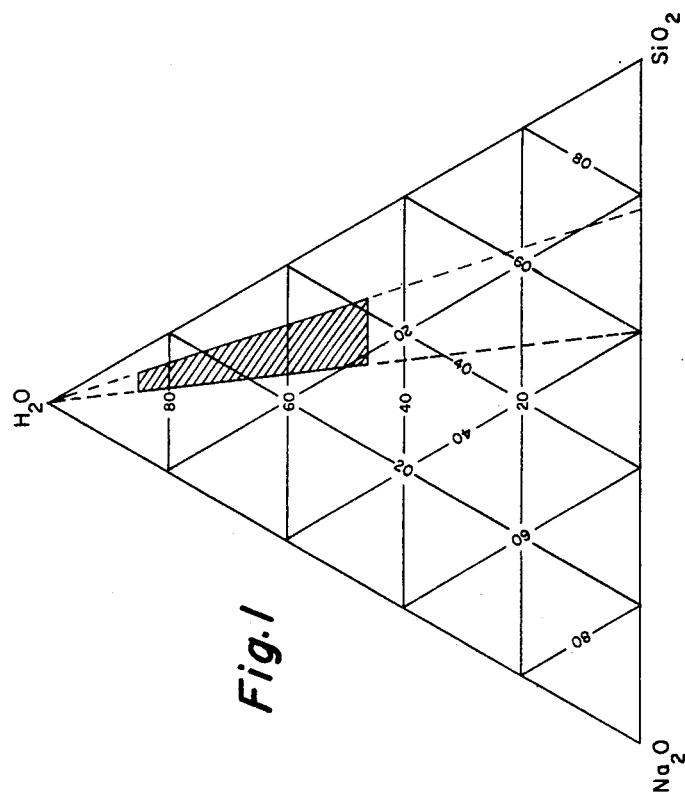
FIG. 1 is a ternary diagram illustrating suitable compositions of the three component system including water, sodium oxide and silicone dioxide.

FIG. 1 is a ternary diagram illustrating the three component system: water, $Na_2O$, $SiO_2$. The aqueous sodium silicate compositions which are useful in this invention are shown in the shaded areas of the diagram, i.e., a. water content 45 to 85 percent by weight, b. $SiO_2/Na_2O$ ratio 1.5 to 3.75 by weight (i.e., 21% to 40% by weight $Na_2O$, balance $SiO_2$) as shown by the two broken lines.

The increasing viscosity which occurs upon mixing aqueous sodium silicate with unsaturated polyester resin syrup appears to be the result of several competing phenomena which are principally:

A. The formation of carboxylate salts by reaction of the unreacted carboxylic acid groups of the unsaturated polyester resin with the alkali metal ions of the aqueous sodium silicate;

B. The conversion of the sodium silicate to a hybrid silica gel.

A number of factors influence the rate of viscosity increase including:

the weight ratio of $SiO_2Na_2O$;

the acid value of the unsaturated polyester resin;

the initial viscosity of the unsaturated polyester resin syrup and of the aqueous alkali metal silicate solution.

To some extent the viscosity increase depends upon the amount and identity of polymerizable monomer included in the unsaturated polyester resin syrup; also the identity and concentration of the particulate fillers, if any, in the mixture may affect the viscosity increase.

While it is possible to produce unsaturated polyester resins with very low acid numbers, these materials are not generally commercially available because of the excessive cooking times required to lower the acid value. Moreover the unsaturated polyester resins with relatively high acid values tend to be more stable than the very low acid value unsaturated polyester resins. In the present process, the caustic sodium silicate solution tends to neutralize the acidity of the unsaturated polyester resin; at the same time the unsaturated polyester resin is lowering the pH of the sodium silicate solution, thereby upsetting the silicate equilibrium and causing formation of a hybrid silica gel. In the resulting cured product, the continuous phase comprises the hybrid silica gel and also comprises cured unsaturated polyester resin cross-linked with the copolymerizable monomer wherein the resin contains alkali metal carboxylate salt groups.

Silica gels are known to exist in at least three different types including a polymerization gel, a flocculation gel, and a mixed or hybrid gel.

The polymerization gel results from the conversion of aqueous sodium silicate to silicic acid by neutralization. The polymerization gel consists of polysilicate ions extended as a three-dimensional, cross-linked network throughout the solution. The flocculation gel occurs when preformed colloidal silica particles combine through junction points with siloxane bonds. The hybrid gel appears to be a combination of the first two forms of gel and includes preformed colloidal silica particles joined by polysilicic acid chains. These hybrid gels can be synthesized by gradually neutralizing mixtures of silicates and colloidal silica sols.

In general, the cured products obtained by polymerizing the alkaline mixtures of unsaturated polyester resin syrup and aqueous alkali metal silicate will contain at least 5 percent by weight of the hybrid colloidal gel homogeneously dispersed with the cross-linked unsaturated polyester resin syrup wherein at least a portion of the cross-linked polyester contains carboxylate salt end groups in its polymerized state.

The carboxylate salt phenomenon will be discussed in connection with three infra-red spectrum analysis charts supplied as FIG. 3. An infra-red spectrum analysis, FIG. 3-A, was obtained for an unsaturated polyester resin syrup II. The unsaturated polyester resin syrup II is prepared from 90.3 mols propylene glycol, 12.5 mols dipropylene glycol, 43.75 mols phthalic anhydride and 56.25 mols maleic anhydride, cooked to an acid value of 30 to 40. 73 parts by weight of the polyester are combined with about 27 parts by weight of styrene to produce the polyester resin syrup II. A characteristic carboxylic acid ester linkage response is prominent at about 5.7–5.8 microns as indicated by the numeral 6.

Figure 3C:
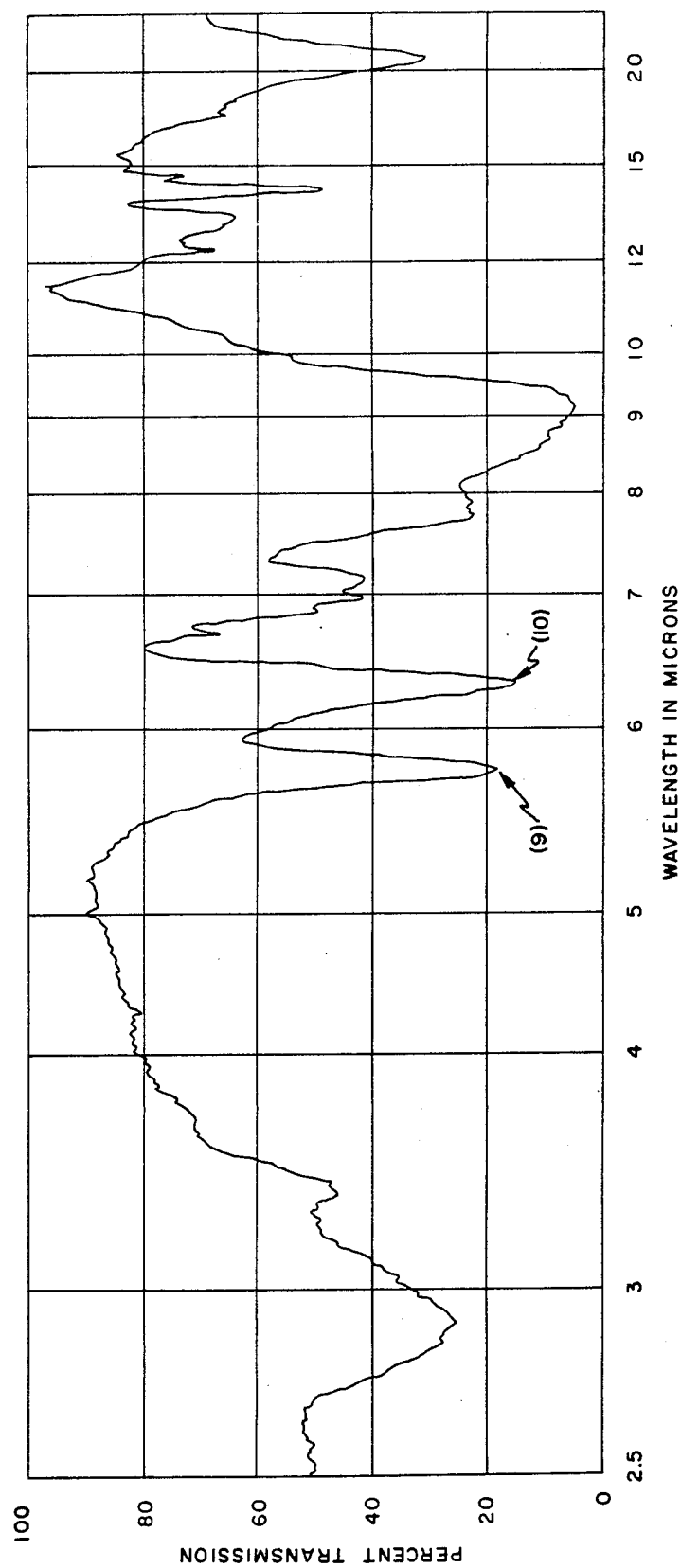
FIG. 3 is a reproduction of three infra-red spectra for ingredients and products of this invention, 3-A, 3-B, 3-C.

Equal weights of aqueous sodium silicate grade N and resin I were mixed, dried and analyzed by infra-red spectrum analysis to produce the chart of FIG. 3-B. The dried sample shows a small concentration of the carboxylic acid ester linkage at about 5.7 – 5.8 microns, as indicated by the numeral 7, and shows a prominent concentration of a carboxylate salt at about 6.3 microns as indicated by the numeral 8. It was necessary to dry the sample of the mixture of unsaturated polyester resin syrup and aqueous sodium silicate in order to prevent interference with the potassium bromide plates which are employed in the infra-red spectrum analysis equipment.

A 50/50 weight mixture of aqueous sodium silicate grade N and unsaturated polyester resin syrup II was cured and analyzed. The spectrum analysis is presented in FIG. 3-C. A prominent concentration of carboxylic esters appears at 5.7 – 5.8 microns, as indicated by numeral 9, and a prominent concentration of carboxylate salt appears at about 6.3 microns, as indicated by the numeral 10.

It appears that the cured polymeric product possesses a substantial amount of carboxylate salt.

Examples of the present invention will further illustrate its utility.

EXAMPLE 1

An unsaturated polyester resin syrup (hereinafter identified as resin syrup I) contains 25 parts by weight styrene and 75 parts by weight of the unsaturated polyester resin which is obtained as follows:

60 mols phthalic anhydride
40 mols maleic anhydride
106 mols propylene glycol are combined and esterified to an acid number of about 20 to produce a general purpose unsaturated polyester resin which is employed in most of the examples hereinafter. One gram of benzoyl peroxide powder is added to 100 grams of the unsaturated polyester resin syrup I as a catalyst. This unsaturated polyester resin syrup is combined with 100 grams of aqueous sodium silicate containing 63 percent by weight water and 37 percent by weight dissolved solids. The weight ratio of $SiO_2/Na_2O$ is 3.2. This aqueous sodium silicate is commercially available from Philadelphia Quartz Company and is identified as silicate N.

Following mixing of the two liquids, the mixture thickens rapidly and has the appearance of white paste. The mixture was applied to a sheet of cellophane within a ½ inch diameter tubing O-ring having a 6 inch ring diameter. A second sheet of cellophane was applied on top of the O-ring and the resulting cellophane sandwich was pressed to produce a disk ½ inch thick and 6 inches in diameter. That disk was placed in an oven at 90° C. for about 15 minutes. The disk was allowed to set overnight and lost some water content through evaporation. The disk had a chalkywhite appearance and a density of 0.75. Thereupon the disk was placed on a ring stand approximately 2 inches above a Bunsen burner. The Bunsen burner flame impinged upon the disk. Within the first 5 minutes of impingement some small amount of smoke was detected. Thereafter no smoke was observed. The disk remained over the Bunsen burner for 6 hours. Throughout the flame exposure, the disk retained its shape and integrity.

EXAMPLE 2

Example 1 was duplicated except that the unsaturated polyester resin syrup I was modified by including two drops of Triton X-100, a non-ionic surfactant available from Rohm & Hass Company. The aqueous sodium silicate contained one drop of Triton X-100 per 100 grams. Equal parts of the resin syrup and the silicate were mixed and formed into a disk ½ inch thick and 6 inches in diameter. This disk was tested in the manner described in Example 1 with the same results. A conclusion from Example 2 is that the absence of a surfactant (Example 1) is indistinguishable from the presence of a surfactant (Example 2).

EXAMPLE 3

50 grams of the unsaturated polyester resin syrup I is combined with 50 grams of alumina trihydrate, minus-325 mesh U.S. standard screen, and 0.5 gram benzoyl peroxide powder to form component 1. 50 grams of aqueous sodium silicate N is combined with 50 grams of alumina trihydrate, minus-325 mesh U.S. standard screen, to form component 2. When the aluminum trihydrate is mixed with the aqueous sodium silicate, a thixotropic slip is formed having a viscosity of 70 to 6000 cps (Brookfield). Component 1 and component 2 are mixed together and formed into a disk ¼ inch thick and 4 inches in diameter. The disk is cured in an oven at 90° C. for 15 minutes. The disk has a chalky-white appearance and is tested as described in Example 1. Essentially no smoke or flame is detected throughout the 6 hour test. The burnt out disk appears to be a continuous, lightweight composition.

Example 3 illustrates a composition extended with equal weights of alumina trihydrate based on the combined weight of unsaturated polyester resin syrup and aqueous sodium silicate.

EXAMPLE 4

Example 3 is repeated except that 10 grams of perlite (minus-40 mesh U.S. standard screen) is thoroughly mixed into the mixture of component 1 and component 2. The composition is shaped into a disk ⅜ inch thick and 3 inches in diameter. The disk is cured and tested in the manner described in Example 1. No smoke or flame is detected during the test. After the sample has been over the Bunsen burner flame for one hour, the topside can be touched by hand without discomfort indicating that the material possesses outstanding thermal insulation characteristics.

EXAMPLE 5

Example 3 is repeated with two variations. The first variation is that the alumina trihydride is minus-100 mesh U.S. standard screen. The second variation is that the aqueous sodium silicate component contains 0.1 grams N,N'-dimethyl aniline as a polymerization accelerator. Components 1 and 2 are mixed and formed into a disk ¼ inch thick and 4 inches in diameter. The sample cures at room temperature in about 1 hour. This example indicates the feasibility of providing a polymerization catalyst in the unsaturated polyester resin syrup and providing a polymerization accelerator in the aqueous alkali metal silicate.

EXAMPLE 6

Example 3 is repeated with one variation. Component 1 consists of 50 grams of polymerizable unsaturated polyester resin I and 50 grams of alumina trihydrate (minus-325 mesh U.S. standard screen) and 0.1 gram methyl ethyl ketone peroxide (60% solution in dimethyl phthalate) and 20 drops cobalt naphthenate (6% solution in glycol). The viscosity of component 1 is about 4000 to 5000 cps (Brookfield). Component 2 is the same as in Example 3. Components 1 and 2 are thoroughly mixed and shaped into a disk ¼ inch thick and 4 inches in diameter. The disk cures in approximately 45 minutes at room temperature.

This example indicates the feasibility of providing a catalyst and an accelerator in the unsaturated polyester resin syrup.

EXAMPLE 7

A number of disks were prepared employing component 1 and component 2 as described in Example 5. The ratio of component 1/component 2 was 80/20, 60/40, 50/50, 40/60, 20/80, and 10/90. Each of the formulations was formed into a disk ¼ inch thick and 4 inches in diameter. Each disk was tested as described in Example 1. The results of the tests are set forth in the following table.

Table I

| Specimen | Component 1 / Component 2 By Weight | Smoke | Flame | Appearance After 6 Hrs. Burning |
|---|---|---|---|---|
| A | 80/20 | - Heavy - | | Fell Apart |
| B | 60/40 | - Light - | | Fell Apart |
| C | 50/50 | Light | Very Light | Fair |
| D | 40/60 | - Very Light - | | Good |
| E | 20/80 | - Hard to Detect - | | Very Good |
| F | 10/90 | - Hard to Detect - | | Excellent |

It will be observed from Table I that the specimens (A, B) with a high content of unsaturated polyester resin syrup tend to produce smoke, flame and to deteriorate when exposed to burning. As the amount of unsaturated polyester resin syrup is decreased, the amount of smoke and flame decreases and the resistance to burning increases. The materials become increasingly difficult to mix as the amount of unsaturated polyester resin syrup is diminished. Specimens A, B, C and D mix readily. Specimen E is a little difficult to mix. Specimen F was quite difficult to mix. The mixing difficulty arises from the tendency of the mixed materials to increase rapidly in viscosity.

EXAMPLE 8

Example 3 is repeated with the exception that component 2 is formulated from 50 grams of aqueous potassium silicate solution containing 71 percent by weight water and 29 percent by weight dissolved solids having a weight ratio of $SiO_2/K_2O$ of 2.5. Component 2 also includes 50 grams of alumina trihydrate (minus-325 mesh U.S. standard screen). Components 1 and 2 are blended together and shaped into a disk ¼ inch thick and 4 inches in diameter. The disk is cured by heating at 90° C. The disk is tested as described in Example 1. Almost no smoke or flame is detected during the test. The burnt material after 6 hours exposure to the flame is a continuous lightweight composition.

This example indicates that aqueous potassium silicate is effective in the same manner as aqueous sodium silicate.

EXAMPLE 9

A sprayable system is prepared by assembling ingredients in the manner to be described.

| Component 1 | | |
|---|---|---|
| Unsaturated polyester resin syrup I | 16 pounds | |
| Styrene | 3 pounds | |
| Benzoyl peroxide powder | 0.9 pounds | |
| Triton X-100 (surfactant) | 0.25 pounds | |
| Aluminum oxide trihydrate (minus-325 mesh U.S. standard screen) | 23 pounds | |
| Total | 43.15 pounds | |

| Component 2 | | |
|---|---|---|
| Aqueous sodium silicate (as in Example 1) | 10 pounds | |
| Water | 10 pounds | |
| Styrene | 0.5 pounds | |
| N, N'-dimethyl aniline | 1 ounce | |
| Triton X-100 (surfactant) | 0.25 pounds | |
| Aluminum oxide trihydrate (minus-325 mesh U.S. standard screen) | 30 pounds | |
| Total | 50.8 pounds | |

Note:
The N, N'-dimethyl aniline is dissolved in the styrene and the solution is added to component 2.

Components 1 and 2 are sprayed on various substrates by two different methods.

Method 1 — A dual head spray gun includes two separate spray heads. Component 1 is sprayed through one spray head; component 2 is sprayed through the other spray head. The sprays are impinged approximately 6 inches beyond the spray nozzles to achieve intimate mixing.

Method 2 — A spray gun having a mixing chamber is employed in such manner that component 1 and component 2 are mixed within the mixing chamber and sprayed as a mixture onto the substrate.

In both spraying systems, a glass roving chopper is positioned adjacent to the spray patterns to deposit chopped glass fibers approximately 2 inches long into the spray patterns in order to incorporate the glass fibers into a spray-up composition. The sprayed compositions have been applied to ordinary steel sheets, galvanized steel sheets, glass fiber reinforced polyester resin panels, a dry wall, a wood plank, an acrylic resin sheet, a sheet of paper, a sheet of stainless steel, a concrete surface, a sheet of expanded metal lath, a cotton cloth, a polyester fiber cloth, a sheet of leather, a sheet of rubber, a sheet of rigid polyurethane foam and a glass plate. In all cases the sprayed on material adheres well to the substrate. Adhesion is obtained with substrates disposed vertically, disposed in a sloping position, disposed horizontally below the spray and disposed horizontally above the spray. The resulting coatings have been produced in thicknesses from about 1/16 inch to thicknesses of several inches. Curing of the coatings occurs within a matter of several minutes.

It will be observed that component 1 contains an abnormally high quantity of benzoyl peroxide as a catalyst. The reason for employing excess catalyst in these tests is to assure prompt curing of the composition in order to permit handling of the coated substrate in a very short period of time following the spraying.

Additional styrene is included in this series of tests to facilitate the spraying of component 1.

The additional water in Example 9 is added to lower the viscosity of component 2 to facilitate spraying.

It will also be observed that the total formulation contains more than 56 percent by weight alumina trihydrate. The two components 1 and 2 are sprayed in approximately equal weight ratios.

EXAMPLE 10

The formulations described in Example 9 are applied to both sides of a sheet of expanded metal lath to produce a panel. The expanded metal lath was 2 feet by 8 feet. The product can be prepared in the following manner. A sheet of cellophane is spread on a table. A coating of the present composition along with approximately 6 percent by weight glass fiber is applied to the cellophane sheet. Thereafter a sheet of expanded metal lath is deposited on top of the composition and rolled for partial embedment in the composition. Thereafter an additional coating of the present composition along with approximately 6 percent by weight glass fibers is applied on top of the expanded metal lath. The top coating is covered with another sheet of cellophane and the panel is allowed to cure.

A panel produced in this fashion was ⅜ inch thick.

The panel just described was subjected to a flame spread tunnel test similar to the ASTm E84 tunnel test. The panel rates as follows:

| | |
|---|---|
| Flame spread | 7.69 |
| Smoke generation | 1.56 |

EXAMPLE 11

A building was sprayed with the present coating composition. The building was a corrugated metal panel building having a centrally pitched roof. The roofing panels were uncoated steel surfaces. The vertical side wall panels had been previously coated with a spray-applied polyurethane foam coating approximately one inch thick as thermal insulation. The vertical walls had a total surface area of about 4,000 square feet.

Component 1 of the coating composition was prepared by combining:
unsaturated polyester resin syrup I — 45 pounds;
hydrated alumina, minus-325 mesh U.S. standard screen — 50 pounds;
benzoyl peroxide (50 percent by weight in a suitable plasticizer) — 1 pound.

Component 2 was prepared by combining:
N grade aqueous sodium silicate — 35 pounds;
water — 10 pounds;
hydrated alumina, minus-325 mesh U.S. standard screen — 70 pounds;
dimethyl aniline — 125 grams.

Components 1 and 2 were introduced at equal flow rates separately into the two spray heads of a dual head spray nozzle. The spray nozzle developed two cone sprays which impinged at a distance of 4 to 6 inches from the spray tips. The spray nozzles utilized exterior air atomizing. Components 1 and 2 were pumped at pressures of about 150 psi. The atomizing air pressure ranged from 40 to 90 psi. A chopped glass roving gun provided 1 inch long chopped strands of glass fiber roving at the region of spray impingement.

A fire retardant coating was spray-applied to the interior of the building over the polyurethane foam thermal insulation and also over the interior metal surfaces of the pitched roof panels. The coating was applied in three sequential operations as follows:

First step: A thin film of the two mixed liquid sprays, without glass fibers, was applied to a selected small area of the wall surface in order to wet the surface.

Second step: A film of glass fibers plus the mixed sprays was applied to the wetted surface.

Third step: A further film of the mixed sprays without glass fibers was applied on top of the coatings.

No deliberate attempt was made to roll the coating. Instead the glass fibers were allowed to settle as applied. Preponderantly the fibers laid flat upon the wall surfaces. The films adhered well to the foam surface and also to the bare metal roof panels. The thickness of the coating was varied intentionally to permit observation of the effect of different thickness. Thicknesses from about 1/16 inch to about ¼ inch were applied and observed. Coating thicknesses in this range had no observable effect on the adhesion properties.

Within about 1 hour after application the coating was free of tackiness.

The building interior was entirely coated with the described coating material. The coating serves as fire protection for the polyurethane foam thermal insulation on the vertical side walls. The function of the coating on the bare metal pitched roof panels in this installation is merely to demonstrate the adhesion characteristics. The present coatings would not normally be applied to the interior surfaces of bare metal pitched roof ceilings. However the present coating compositons have utility as fire barrier coatings when applied to the metal undersurfaces of steel floors.

EXAMPLE 12

Spray-up laminates were prepared on a cellophane sheet with the formulation and equipment described in Example 11. ASTM samples ⅛ inch thick were prepared and tested. The samples contained 20 percent glass fibers by weight. The observed physical properties were:

flexural strength — 8,873 psi
flexural modulus — $0.369 \times 10^6$
tensile strength — 5,521 psi
tensile modulus — $0.437 \times 10^6$ Added samples of this spray-up laminate, 14 centimeters long, 5 centimeters wide and a nominal ⅛ inch thick, were obtained. The density of the samples averaged 1.3 after drying at room temperature. These samples were exposed for 4,000 hours in weather-o-meter tests as described in National Bureau of Standards Publication 260-15 using Standard Reference Material 710-c. The samples exhibited some chalkiness on their surface. The samples retained whiteness and exhibited no gross deterioration.

Added samples of the spray-up laminate as described were placed in a condensing humidity cabinet at 150° F. for 2500 hours exposure. The samples exhibited slight surface chalk and had no color change or loss of integrity.

EXAMPLE 13

The effect of viscosity increase was illustrated by adding aliquot portions of aqueous sodium silicate to unsaturated polyester resin syrup I. 546 grams of polyester resin syrup I contains approximately 200 milliequivalents of carboxylic acid groups.

Aqueous sodium silicate N was added in aliquot portions of about 5.7 grams each. Each aliquot contained about 20 milliequivalents of caustic.

The viscosity of the mixture was measured after each sodium silicate aliquot was added. The viscosity increase is shown in FIG. 2 wherein the viscosity in centipoises is plotted as the Y axis and the weight of added aqueous sodium silicate is plotted as the X axis. Initially the viscosity of the resin syrup I alone was about 400 cps, Point 1 on the graph. Following the mixing of a first aliquot of the aqueous sodium silicate, the viscosity increased to about 850 centipoises. The viscosity continued to increase approximately linearly until about 7 aliquots of the aqueous sodium silicate had been added, Point 2 on the graph. Thereafter the viscosity continued to increase sharply until the tenth aliquot was added, Point 3 on the graph. Thereafter the viscosity increased only gradually with further additions of aqueous sodium silicate. The additions were discontinued after the 17th addition, Point 4 on the graph, at which time the viscosity was about 117,000 centipoises.

The following day the viscosity was measured again and found to be about 750,000 centipoises, Point 5 on the graph.

FIG. 2 illustrates in a graphical manner the existence of multiple competing phenomena which influence the viscosity increase when aqueous sodium silicate is added to unsaturated polyester resin syrup having a relatively high acid value, specifically, about 20 in Example 13. The continuing increase in viscosity with time, compare Points 4 and 5, suggests that the material can be worked by spraying or troweling for reasonable periods of time. The unsaturated polyester resin syrup of Example 13 contained no curing catalysts.

EXAMPLE 14

The thermal insulation characteristics of the present materials were determined by comparing the temperature increase of an uncoated galvanized steel sheet against the temperature increase of a galvanized steel sheet coated with ¼ inch of a formulation hereinafter described. Specifically a galvanized sheet, 18 gauge 6 inches by 8 inches was placed against the open door of a muffle furnace. The interior temperature of the muffle furnace was maintained at 1500° F. The room surface of the steel sheet leveld off at 1400° F. Thereafter the interior temperature of the muffle furnace was increased to 1900° F. and the room surface of the galvanized steel sheet leveled off at 1800° F.

An identical sheet of galvanized steel was coated with a ¼ inch thick coating of a formulation hereinafter described. The coating was applied to the steel by troweling. The steel sheet was placed against the open door of the muffle furnace and the coated surface was exposed to the room. The muffle furnace temperature was maintained at 1500° F. and the outside temperature of the present coating leveled off at about 720° F. Thereafter the muffle furnace temperature was increased to 1900° F. and the outside surface of the coated steel sheet leveled off at about 980° F. This Example 14 illustrates the use of the present formulations in thermal insulating compositions. The thermal insulating compositions are particularly attractive in coating exposed steel surfaces in buildings.

The formulation of Example 14 includes:

An unsaturated polyester resin syrup formed from 6 mols phthalic anhydride, 4 mols maleic anhydride and 11.5 mols of propylene glycol cooked to an acid value of 16–21. 71 parts by weight of the polyester are combined with 29 parts by weight styrene to produce an unsaturated polyester resin syrup III.

The coating of Example 14 was prepared by combining:

| | |
|---|---|
| 500 grams | - unsaturated polyester resin syrup III; |
| 1 gram | - Triton X-100, a non-ionic surfactant of Rohm & Haas Company; |
| 1000 grams | - aluminum oxide trihydrate, minus-100 mesh U.S. standard screen; |
| 125 grams | - aqueous sodium silicate N grade; |
| 250 grams | - added water |

The ingredients were mixed to produce a putty-like composition. 200 grams of the putty-like composition were mixed with 50 grams agricultural grade perlite, sized to about ⅛ inch and finer. Then 1 gram of benzoyl peroxide was added to produce the coating material.

Added samples of the composition of Example 14 were prepared by troweling a ¼ inch coating onto a sheet of galvanized steel, about 1 inch by 4 inches. The coated steel sheets were placed in a beaker of tap water so that the lower half of the sheets (approximately 1 inch by 2 inches) was immersed for 100 hours. Following this exposure, the coating appeared to be identical throughout, indicating water insensitivity.

EXAMPLE 15

A polyester resin was prepared by combining 13 mols propylene glycol, 6 mols phthalic anhydride and 4 mols maleic anhydride. The resin is cooked to an acid value of about 8 to 10. Thereafter 70 parts by weight of the resin is combined with 30 parts by weight styrene to produce an unsaturated polyester resin syrup IV.

Component 1 of a cold molding composition was prepared by combining 432.4 grams of unsaturated polyester resin syrup IV, 64.9 grams styrene, 5.4 grams Triton X-100 non-ionic surfactant and 497.3 grams powdered aluminum oxide trihydrate.

Component 2 was prepared by combining 290.4 grams of aqueous sodium silicate grade N, 193.6 grams water, 9.8 grams styrene, 1.3 grams dimethyl aniline, 4.9 grams Triton X-100 non-ionic surfactant and 500 grams powdered aluminum oxide trihydrate. 10.8 grams of benzoyl peroxide was added to the component 1 along with 200 grams of ¼ inch chopped glass strands of the type customarily employed in pre-mix molding compositions. Thereupon one part of component 1 be weight and one part of component 2 by weight were combined to produce a molding composition. A sample of the molding composition was introduced into a pie plate mold and pressed at room temperature. The uncured, shaped pie plate was removed from the press and allowed to sit overnight until cured at room temperature. After 64 hours, the pie plate exhibited a weight loss of 13.59 percent indicating dehydration.

Following about a week ASTM properties of the pie plate samples were measured as follows:
flexural strength — 1,526 psi
flexural modulus — $0.338 \times 10^6$
tensile strength — ]425 psi
tensile modulus — $0.3125 \times 10^6$

EXAMPLE 16

A further example of cold molding articles with the present formulations also employed unsaturated polyester resin syrup IV. Component 1 was prepared by combining 432.4 grams of unsaturated polyester resin syrup IV, 64.9 grams styrene, 5.4 gram Triton X-100 non-ionic surfactant, 497.3 grams powdered aluminum oxide trihydrate and 5.4 grams hydroquinone. Component 1 also received 10.80 grams benzoyl peroxide. 200 grams of chopped glass fibers, ¼ inch long were added to component 1.

Component 2 was prepared by combining 242 grams aqueous sodium silicate, grade N, 242 grams water, 9.80 grams styrene, 1.30 grams dimethyl aniline, 4.9 grams Triton X-100 non-ionic surfactant and 500 grams powdered aluminum oxide trihydrate. The materials when mixed in equal amounts exhibited a gel time of 4 minutes. The materials were introduced into a pie plate mold at room temperature and pressed. The pressed pie plate was removed and allowed to sit at room temperature overnight to cure. About a week after the cure, samples were cut from the pie plate and ASTM evaluations were carried out as follows:
flexural strength — 2,252 psi
flexural modulus — $0.211 + 10^6$
tensile strength — 895 psi
tensile modulus — $0.253 + 10^{6 \ INa}$ Examples 15 and 16 demonstrate that the present formulations can be employed to produce useful cold molded products, e.g., statuary, toys.

EXAMPLE 17

Several compositions were prepared with commercially available aqueous sodium silicates other than the heretofore described N grade.

50 grams of the unsaturated polyester resin syrup I was combined with 0.5 grams benzoyl peroxide to constitute component 1. Component 2 was prepared by combining 50 grams of aqueous sodium silicate and 0.05 gram of dimethyl aniline. In Example 17-A, the aqueous sodium silicate had a $SiO_2/na_2O$ ratio of 2.50 and a water content of 62.9 weight percent. In Example 17-B, the aqueous sodium silicate had a $SiO_2/Na_2O$ ratio of 2.0 and a water content of 55.9 weight percent. In both Examples 17-A and 17-B components 1 and 2 were combined in a paper cup and stirred with a spatula. The mixture turned white, thickened and cured in the same manner as set forth in Example 1.

EXAMPLE 18

Molded resinous bathtubs were fabricated with the present composition. The bathtubs were fabricated from a vaccum formed thermoplastic acrylic sheet having a nominal thickness of about 15 mils. The thermoplastic sheet was drawn into a mold having the shape of a bathtub and thereafter removed from the mold and supported in a suitable jig. Using formulations hereinafter to be described, three specific bathtubs were fabricated by hand-spray-up techniques. One bathtub had an approximately ⅛ inch thickness coating of the present composition; another tub had a 3/16 inch average thickness coating; the third tub had a coating of approximately ¼ inch average thickness. The coatings were applied by spraying an unsaturated polyester resin syrup into a spray of aqueous sodium silicate. The two sprays impinged upon a downwardly flowing stream of chopped glass fibers from a glass fiber roving chopper. The coating adhered to the convex surface of the vacuum formed thermoplastic acrylic sheet and was hand rolled and worked to embed the fibers. The fibers constituted 25 to 30 percent of the weight of the coating. The resin mixture contained 50 pounds of an unsaturated polyester resin hereinafter to be described,
10 pounds styrene,
27.4 grams hydroquinone,
40 pounds finely divided hydrated alumina (100 percent −325 mesh U.S. standard screen), and
544.8 grams benzoyl peroxide. The aqueous sodium silicate included
20 pounds of N grade aqueous sodium silicate,
20 pounds water,
60 pounds finely divided hydrated alumina (100 percent −325 mesh U.S. standard screen), and
272 grams N,N'-dimethyl aniline.

The two liquid ingredients were maintained at 350 psi pressure and were sprayed by means of an airstream maintained at 90 to 100 psi. The glass fiber roving had a silane sizing and was chopped to approximately one-inch lengths. After 15 to 20 minutes the coatings had hardened and useful bathtubs were removed from the jigs.

The unsaturated polyester resin of this example was prepared by combining 1.06 mols of propylene glycol with 0.4 mols maleic anhydride and 0.6 mols phthalic anhydride. The resin has an acid number of 20–26. 72 pounds of the resulting resin are combined with 23 pounds of styrene to produce the unsaturated polyester resin of this example.

I claim:

1. A polymerizable composition consisting essentially of the alkaline reaction product of (a) one part by weight of unsaturated polyester resin syrup; and (b) 0.3 to 10 parts by weight of aqueous sodium silicate; said composition including a polymerization initiator for unsaturated polyester resin syrup, wherein the said aqueous sodium silicate contains 45 to 85 parts by weight water and 55 to 15 parts by weight of sodium silicate solids having a weight ratio of $SiO_2/Na_2O$ of 1.5 to 3.75.

2. A polymerizable composition having one part by weight of the composition of claim 1 uniformly dispersed with 0.01 to 5.0 parts by weight of finely divided fillers.

3. The composition of claim 2 wherein the finely divided fillers are aluminum oxide trihydrate in an amount which is less then the sum of 1.5 times the weight of unsaturated polyester resin syrup plus 3.0 times the weight of aqueous alkali metal silicate.

4. The composition of claim 1 wherein the said unsaturated polyester resin has an acid value of 10 to 100 on a 100 percent solids basis.

5. The composition of claim 2 wherein the finely divided fillers are inert materials.

6. The composition of claim 5 wherein the finely divided fillers are perlite, comprising 0.01 to 0.10 parts by weight.

7. The composition of claim 5 wherein the finely divided fillers are expanded vermiculite, comprising 0.01 to 0.1 parts by weight.

8. The composition of claim 3 wherein the finely divided fillers are glass fibers comprising from 10 to 200 percent by weight of the said unsaturated polyester resin syrup.

9. The composition of claim 1 including an accelerator for said polymerization initiator.

10. The polymerizable composition of claim 1 wherein the said unsaturated polyester resin syrup is a combination of
   A. unsaturated polyester resin comprising the reaction products of polyhydric alcohol and polycarboxylic acid or anhydride, at least a portion of which are ethylenically unsaturated polycarboxylic acids or anhydrides; and
   B. at least one copolymerizable monomer having ethylenic unsaturation.

11. The method of preparing a cured thermoset article which comprises
   A. mixing together under reactive conditions as an alkaline mixture
      1. component 1 comprising one part by weight of an unsaturated polyester resin syrup; and
      2. component 2 comprising 0.1 to 10 parts by weight of an aqueous sodium silicate containing 45 to 85 weight percent water and 55 to 15 weight percent sodium silicate solids having a weight ratio of $SiO_2/Na_2O$ of 1.5 to 3.75,
   the said alkaline mixture including a polymerization initiator for unsaturated polyester resin syrup;
   B. shaping the said alkaline mixture into a mass having the shape of the desired article; and
   C. curing the said mass.

12. The method of claim 11 wherein the said polymerization initiator is an ingredient of component 1.

13. The method of claim 11 wherein the said polymerization initiator is an ingredient of component 2.

14. The method of claim 13 wherein an accelerator for the said polymerization initiator is an ingredient of component 1.

15. The method of claim 11 wherein the said alkaline mixture includes glass fibers constituting from 10 to 200 percent by weight of the said unsaturated polyester syrup.

16. The method of claim 11 wherein the component 1 includes up to 1.5 parts by weight of finely divided aluminum oxide trihydrate.

17. The method of claim 11 wherein the component 2 includes finely divided aluminum oxide trihydrate in an amount up to three times the weight of aqueous sodium silicate.

18. The method of claim 11 wherein the component 2 includes finely divided aluminum oxide trihydrate in an amount up to three times the weight of aqueous sodium silicate.

19. The method of claim 11 wherein the said alkaline mixture includes finely divided fillers.

20. The method of claim 19 wherein the said finely divided inert filler is perlite.

21. The method of claim 19 wherein the said finely divided inert filler is expanded vermiculite.

22. A water insoluble polymerized glass fiber reinforced article consisting essentially of 6 to 30 parts by weight of glass fibers and a thermoset resin produced from the composition as defined by claim 1, said article containing at least 5 percent by weight of a hybrid colloidal silica gel homogeneously dispersed with cross-linked unsaturated polyester resin syrup wherein at least a portion of the said cross-linked polyester contains carboxylate salt end groups in its polymerized state.

23. The article of claim 22 including 0.1 to 5.0 parts by weight of inert fillers dispersed throughout one part by weight of the said resin composition.

24. A fiber reinforced laminate consisting essentially of
randomly oriented reinforcing fibers dispersed in a continuous phase of a thermoset resin produced from the composition as defined in claim 1, said laminate containing containing at least 5 percent by weight of a hybrid colloidal silica gel homogeneously dispersed with cross-linked unsaturated polyester resin syrup wherein at least a portion of the said cross-linked polyester contains carboxylate salt end groups.

25. The laminate of claim 24 wherein the fibers are glass fibers.

26. The laminate of claim 25 wherein the glass fibers comprise 6 to 30 percent of the weight of the laminate.

27. The laminate of claim 24 including finely divided aluminum oxide trihydrate constituting fom 10 to 50 percent of the weight of the laminate.

28. The laminate of claim 24 including finely divided inert fillers consitituting from 0.1 to 5 percent of the weight of the laminate.

* * * * *